May 15, 1962   B. SANDER ET AL   3,034,172
APPARATUS FOR MAKING SWING CHAIN SWIVEL FITTINGS
Filed Dec. 4, 1958   2 Sheets-Sheet 1

INVENTORS.
BENJAMIN SANDER &
ROBERT C. RUEFF
BY
ATT'Y.

May 15, 1962   B. SANDER ET AL   3,034,172
APPARATUS FOR MAKING SWING CHAIN SWIVEL FITTINGS
Filed Dec. 4, 1958   2 Sheets-Sheet 2

*INVENTOR.*
BENJAMIN SANDER &
ROBERT C. RUEFF
BY
ATT'Y.

United States Patent Office 3,034,172
Patented May 15, 1962

3,034,172
APPARATUS FOR MAKING SWING CHAIN
SWIVEL FITTINGS
Benjamin Sander, University City, and Robert C. Rueff, Ferguson, Mo., assignors to Nixdorff-Krein Mfg. Co., St. Louis, Mo., a corporation of Missouri
Filed Dec. 4, 1958, Ser. No. 778,170
3 Claims. (Cl. 18—5)

This invention relates to apparatus for making swivel fittings, particularly for use in chains of the type ordinarily used in playground swings.

It is the primary object of the present invention to provide an apparatus for inserting an antifriction bushing within a chain link and at the same time forming the bushing to a predetermined shape.

It is also an object of the present invention to provide an apparatus of the type stated in which the bushing is shaped so that it is permanently and nonrotatably fitted within the chain link.

It is a further object of the present invention to provide an apparatus in which the bushings are inserted in the chain links at a relatively high rate of speed and with a minimum of manual labor or attention so that manufacturing costs are reduced to a minimum.

With the above and other objects in view, our invention resides in the novel features of form, construction, arrangement, and combination of parts presently described and pointed out in the claims.

In the accompanying drawings (two sheets)—

FIG. 7 is a fragmentary elevational view showing the manner of using the combined bushing and chain link.

Figure 1:
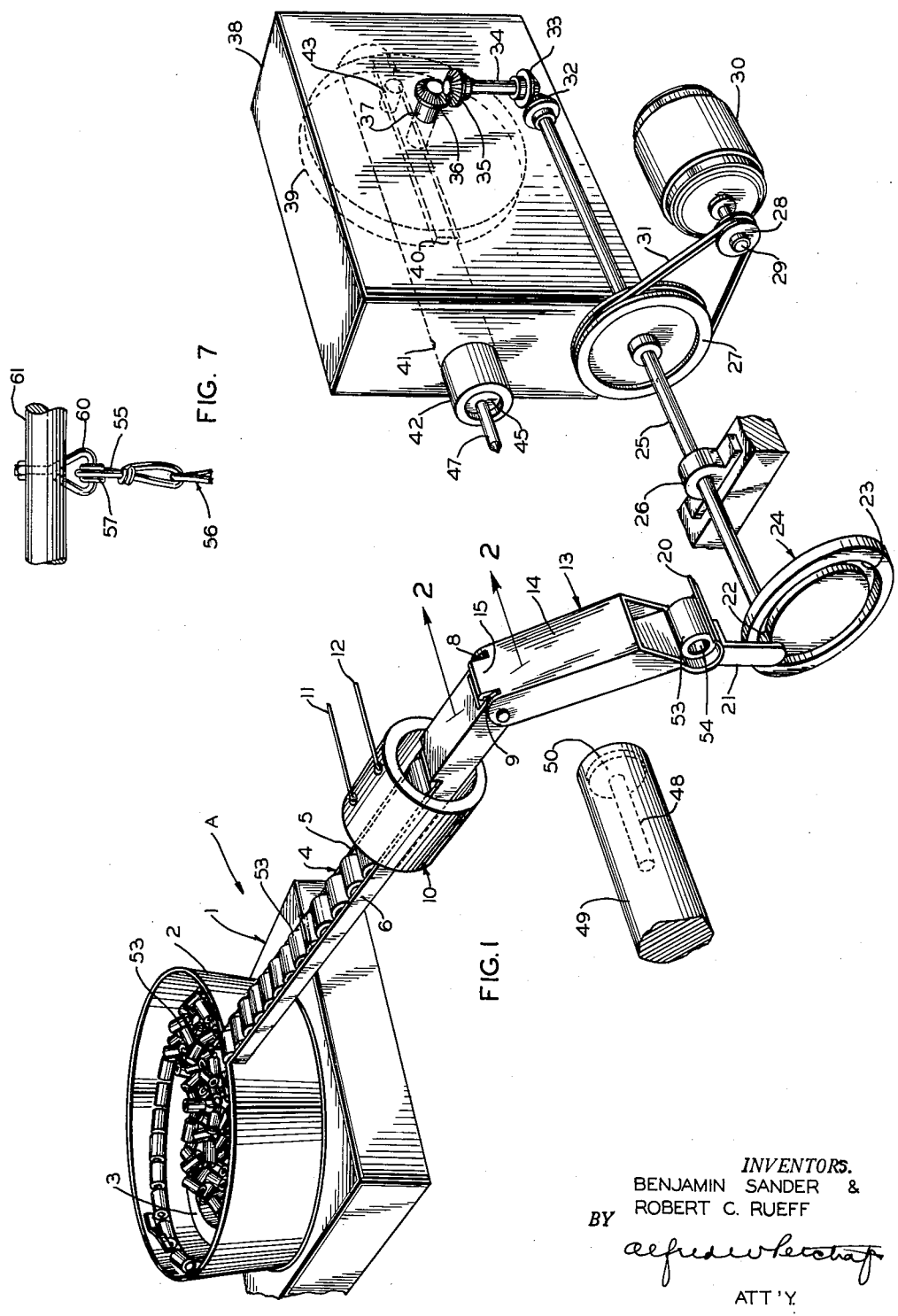
FIG. 1 is a fragmentary perspective view of an apparatus constructed in accordance with and embodying the present invention.

Referring now in more detail and by reference characters to the drawings which illustrate a practical embodiment of the present invention, A designates an apparatus comprising a feeder 1 including a hopper 2 provided with a spiral trackway 3 which terminates at its upper end in an inclined trough 4. The feed mechanism 1 is preferably of the vibratory type sold under the trademark "Syntron," and since feeder mechanisms of this type are well known, the feeder 1 is not shown or described in detail herein. The inclined trough 4 includes spaced parallel side walls 5, 6, which are integrally cross-connected at their lower ends by a bottom wall 7, and at their forward ends the side walls 5, 6, terminate in a pair of ears 8, 9. Encircling the trough 4 upwardly from the ears 8, 9, is a heater 10 having conductors 11, 12 which are connected to a suitable source of electric current (not shown).

Rockably pinned to the ears 8, 9, for vertical swinging movement is a chute 13 provided on its top wall 14 with a rearwardly offset flange 15 which is adapted to project into an opening 16 formed in the discharge end of the inclined trough 4. The chute 13 is also provided with a bottom wall 17 curved upwardly at its rear end in the provision of a flange 18 which is adapted to project through another opening 19, the latter also being formed at the discharge end of the trough 4. At its lower or discharge end and extending outwardly from the bottom wall 17 the chute is provided with an arcuate seat 20 which forms a dispensing station, for purposes presently more fully appearing.

Welded or otherwise rigidly secured to the seat 20 is a depending follower arm 21 provided with a laterally projecting pin 22 which rides in a slot 23 formed in an elliptical cam 24. The cam 24 is eccentrically mounted on a horizontal shaft 25 which is suitably supported by means of the bearing 26. Mounted on the shaft 25 is a driven pulley 27 which is in alignment with the drive pulley 28 mounted on the drive shaft 29 of a suitable electric motor 30, and a drive belt 31 is trained around the pulleys 27, 28. On its end remote from the cam 24 the shaft 25 is provided with a bevel gear 32 which meshes with a bevel gear 33 rigidly mounted on the lower end of a vertical counter shaft 34, and also rigidly mounted on the counter shaft 34 at the upper end thereof is another bevel gear 35 which meshes with a bevel gear 36 mounted on a die-wheel drive shaft 37. The shaft 37 projects through a die-housing 38 rigidly mounted on one side of the chute 13, and the shaft 37 is rigidly provided on its inner end with a wheel 39 having a diametrally extending slot 40 therein.

Formed in the die-housing 38 is a horizontal bore 41 for slidably receiving a reciprocating die member 42 provided with a radially outwardly projecting pin 43 which rides in the slot 40 as the wheel 39 rotates. On its forward end the die member 42 is formed with a die cavity 44 having a flat circular bottom wall 45 which terminates at its outer periphery in an arcuate wall 46. Centrally of the bottom wall 45 and projecting outwardly of the die cavity 44 is an axially extending pin 47 which is in alignment with a bore 48 formed in a fixed die member 49 which is located on the other side of the chute 13. The die member 49 also includes a die cavity 50 which is presented toward the die cavity 44 and comprises a flat bottom wall 51 and arcuate wall 52 which are similar to the walls 45, 46, previously described.

In connection with the present invention it should be noted that the supporting framework and bearings for the housing 38, die member 49, motor 30, shaft 34, and the like, are conventional elements and are, therefore, not shown or described in detail herein.

Figure 2:
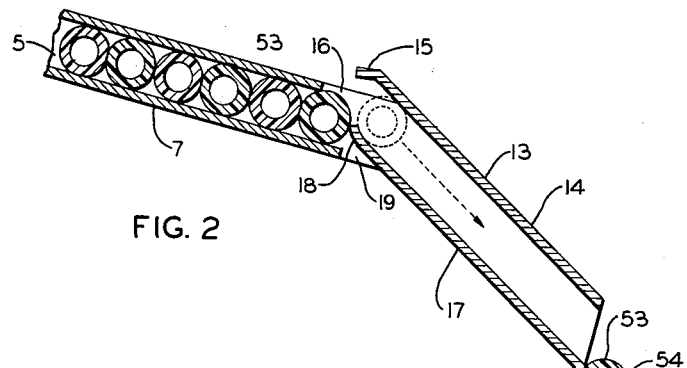
FIG. 2 is a fragmentary sectional view taken along line 2—2 of FIG. 1.
Figure 3:
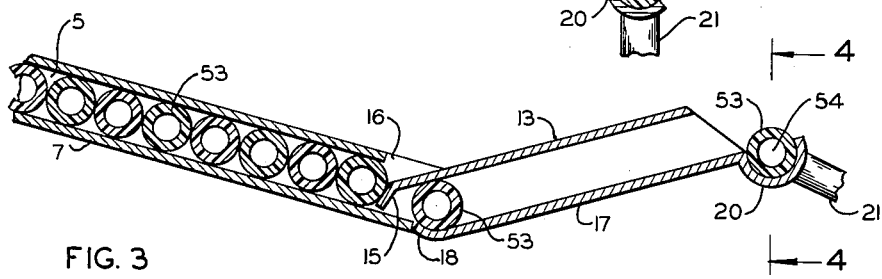
FIG. 3 is a fragmentary sectional view similar to FIG. 2 and showing the rockable chute in its uppermost position.
Figure 4:
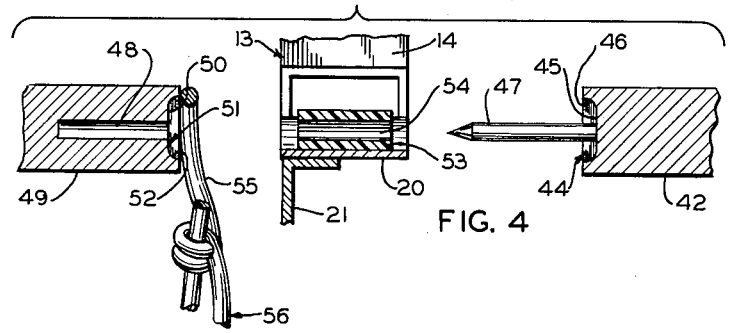
FIG. 4 is a fragmentary sectional view taken along line 4—4 of FIG. 3.
Figure 5:
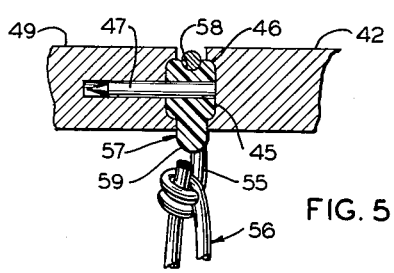
FIG. 5 is a fragmentary sectional view similar to FIG. 4 and showing the formed bushing within the chain link.

In use, a plurality of hollow tubular nylon cylinders or blanks 53 are poured into the hopper 2 whereupon the vibratory action of the feeder 1 causes the blanks 53 to crawl axially up the trackway 3 until they reach the trough 4. Upon reaching the trough 4 the blanks 53 roll downwardly thereon and pass through the heater 10. The first of the blanks 53 will abut the flange 18 and the remaining blanks 53 will successively abut each other so as to fill the trough 4 as shown in FIGS. 1–3. When the motor 30 is operated it will drive the shafts 25, 34, 37, and cause the cam 24 to rotate which, in turn, rocks the chute 13 up and down. When the chute 13 is in its lowermost position the blank 53 at the upper end therein will roll downwardly to the seat 20 as shown in FIG. 2 while the flange 18 will hold back the next blank at the lower end of the trough 4. As the chute 13 moves upwardly carrying with it the blank 53 on the seat 20, the die member 42 will have moved to a position such that the pin 47 is within the central bore 54 of the blank 53 at which time the die member 42 will carry the blank 53 toward the die member 49 and the chute 13 will begin dropping downwardly out of the way of the die member 42.

Figure 6:
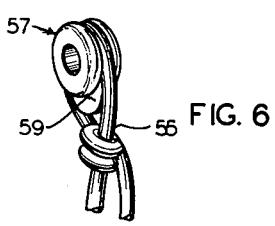
FIG. 6 is a fragmentary perspective view of the chain link and bushing assembled by the apparatus of the present invention.

At the beginning of the cycle, a workman will place the end link 55 of a swing chain 56 adjacent the face of the die member 49 so that as the heated blank 53 is carried toward the die member 49, the blank 53 will pass within the link 55 and be squeezed between the die members 42, 49 with the pin 47 extending into the bore 48. The heated blank 53 will then be shaped within the die cavities 44, 50, as shown in FIG. 6, to form a bushing 57 since the heated blank 53 readily flows within the die cavities 44, 50, and also around the chain link 55. Consequently, the bushing 57 is formed with an annular groove 58 which conforms to the surface contour of the wire stock forming the chain link 55. Furthermore, since the die cavities 44, 50, do not meet and form a closed chamber, the plastic nylon will flow outwardly from between the die members 42, 49, and partially fill the space within the confines of the chain link 55, thereby forming a tongue or flange 59 which holds the bushing 57 non-rotatably within the link 55.

As the chute 13 reaches a point intermediate its extreme upper and lower positions, the next blank 53 will pass from the trough 4 into the upper end of the chute 13 and the next succeeding blank 53 is held back by the flange 15 as shown in FIG. 3. Consequently, during each cycle only one blank will roll down onto the seat 20. Furthermore, while the cycle of operation is reasonably fast, the blanks 53 remain within the heater 10 a sufficient length of time to permit heating the blanks to a temperature of about 400° F. so that when the bushings 57 are formed by the die members 42, 49, the nylon will have sufficient plasticity to be readily flowable.

It has been found that nylon is the preferred material for the blanks 53 but it will be readily apparent that other plastic materials may be used, particularly the other known long chain synthetic polymeric amides.

The bushing 57 may be rotatably mounted on an eyebolt 60 which is, in turn, secured to a cross bar 61, as shown in FIG. 7. The lower end of the chain 56 may support a gymnastic ring or other similar device, but, ordinarily, the swing chains 56 are used in pairs to support a swing seat which is secured in a conventional manner to the lower ends of a pair of chains 56. As the chains 56 swing to and fro, the links 55 and bushing 57 will rock in unison on the eyebolt 60.

It should be understood that changes and modifications in the form, construction, arrangement, and combination of the several parts of the apparatus for making swing chain swivel fittings and in the steps of its production may be made and substituted for those herein shown and described without departing from the nature and principle of our invention.

Having thus described our invention, what we claim and desire to secure by Letters Patent is:

1. Apparatus of the character described comprising a continuously cycling programmer, an inclined trough for receiving a plurality of tubular plastic blanks, means for heating said blanks as they move along said trough, a chute swingably mounted at the lower end of said trough, a blank-receiving station at the lower end of said chute, said station being operatively connected to said programmer and adapted to move in a cycling path therewith, means on said chute for passing a blank from the trough through said chute to said station during each cycling movement of said station, a fixed die member on one side of said station, a shiftable companion die member on the other side of said station; said cycling programmer also being adapted to move said station between said die members, means for driving said shiftable die member toward said fixed die member when the station is in the path of said shiftable die member, and means on the shiftable die member for carrying the blank away from said station and toward said fixed die member, said driving means also being adapted to separate said mated dies upon subsequent movement of said cycling programmer.

2. Apparatus of the character described comprising a continuously cycling programmer, an inclined trough for receiving a plurality of tubular plastic blanks, means for heating said blanks as they move along said trough, a chute swingably mounted at the lower end of said trough, a blank-receiving station at the lower end of said chute, said station being operatively connected to said programmer and adapted to move in a cycling path therewith, means on said chute for passing a blank from the trough through said chute to said station during each cycling movement of said station, a fixed die member on one side of said station and being provided with a central bore, a shiftable companion die member on the other side of said station and having a pin aligned with said bore, said die members each having outwardly opening die cavities, said cycling programmer also being adapted to move said station between said die members, means for driving said shiftable die member toward said fixed die member when the station is in the path of said shiftable die member, whereby the pin will carry the blank away from said station and toward said fixed die member to shape the blank in the die cavities, said driving means also being adapted to separate said mated dies upon subsequent movement of said cycling programmer.

3. Apparatus according to claim 1 in which the means for driving the shiftable die member toward the fixed die member also drives a cam which is operatively connected by means of a link to the swingable chute whereby the chute is swung into and out of the path of the shiftable die member in timed relation to the movement of the shiftable die member.

References Cited in the file of this patent
UNITED STATES PATENTS

| | | |
|---|---|---|
| 2,041,518 | Salz | May 19, 1936 |
| 2,228,614 | Soubier et al. | Jan. 14, 1941 |
| 2,228,930 | Robinson | Jan. 14, 1941 |
| 2,343,982 | Knowlton | Mar. 14, 1944 |
| 2,479,959 | O'Neil | Aug. 23, 1949 |
| 2,525,972 | Stott | Oct. 17, 1950 |
| 2,548,306 | Gora | Apr. 10, 1951 |
| 2,593,668 | Gora | Apr. 22, 1952 |
| 2,688,776 | Evans et al. | Sept. 14, 1954 |
| 2,710,988 | Willcox et al. | June 21, 1955 |
| 2,745,135 | Gora | May 15, 1956 |
| 2,853,118 | Schnitzius | Sept. 23, 1958 |
| 2,922,192 | Morin | Jan. 26, 1960 |

FOREIGN PATENTS

| | | |
|---|---|---|
| 623,911 | Germany | Jan. 7, 1936 |
| 641,917 | Great Britain | Aug. 23, 1950 |